US012436672B2

(12) United States Patent
Guo et al.

(10) Patent No.: US 12,436,672 B2
(45) Date of Patent: Oct. 7, 2025

(54) METHOD AND APPARATUS FOR INTERACTING WITH APPLICATION PROGRAM, AND ELECTRONIC DEVICE

(71) Applicant: Beijing Zitiao Network Technology Co., Ltd., Beijing (CN)

(72) Inventors: Wanyi Guo, Beijing (CN); Yuchen Wang, Beijing (CN); Yirui Cao, Beijing (CN); Qing Song, Beijing (CN); Licong Song, Beijing (CN); Huaxin Wang, Beijing (CN); Liyue Ji, Beijing (CN); Ze Yang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/515,695

(22) Filed: Nov. 21, 2023

(65) Prior Publication Data
US 2024/0086056 A1    Mar. 14, 2024

Related U.S. Application Data

(63) Continuation of application No. PCT/CN2022/090440, filed on Apr. 29, 2022.

(30) Foreign Application Priority Data

May 21, 2021   (CN) .......................... 202110559456.1

(51) Int. Cl.
    *G06F 3/04847*   (2022.01)
    *G06F 3/04817*   (2022.01)
(52) U.S. Cl.
    CPC ...... *G06F 3/04847* (2013.01); *G06F 3/04817* (2013.01)

(58) Field of Classification Search
None
See application file for complete search history.

(56) References Cited

U.S. PATENT DOCUMENTS 9,177,225 B1 * 11/2015 Cordova-Diba .......... G06T 7/12
10,620,801 B1    4/2020 Fein et al.
(Continued)

FOREIGN PATENT DOCUMENTS

| CN | 105828123 A | 8/2016 |
| CN | 106210761 A | 12/2016 |

(Continued)

OTHER PUBLICATIONS

International Search Report and Written Opinion issued Jun. 30, 2022 in International Application No. PCT/CN2022/090440, with English translation (13 pages).

(Continued)

*Primary Examiner* — Ryan Barrett

(57) ABSTRACT

The present disclosure relates to a method and apparatus for interacting with an application program, and an electronic device. The method includes: playing back multimedia content of a target object; and displaying, in a playback page for the multimedia content, an interaction component of the target object. The interactive component comprises: an integrated interactive card and action button. The interactive card is used for describing introductory content of the target object. The introductory content of the target object comprises: the icon of the target object, first basic information of the target object, and extension information of the target object. The action button is used for providing an entry to an interactive page of the target object.

16 Claims, 10 Drawing Sheets

(56) References Cited

U.S. PATENT DOCUMENTS

| | | | |
|---|---|---|---|
| 10,963,925 B2* | 3/2021 | Phillips | G06Q 20/102 |
| 11,589,128 B1* | 2/2023 | Greiner | G06Q 30/0633 |
| 2004/0083143 A1 | 4/2004 | Rodger | |
| 2009/0217320 A1* | 8/2009 | Aldrey | H04N 21/4318 |
| | | | 725/37 |
| 2010/0037153 A1* | 2/2010 | Rogers | G06F 3/0481 |
| | | | 709/227 |
| 2011/0093904 A1 | 4/2011 | Maruyama et al. | |
| 2011/0138317 A1* | 6/2011 | Kang | H04N 21/42224 |
| | | | 715/780 |
| 2012/0128241 A1 | 5/2012 | Jung | |
| 2012/0167146 A1* | 6/2012 | Incorvia | H04N 21/234318 |
| | | | 725/60 |
| 2014/0095328 A1* | 4/2014 | Forouzandeh | G06Q 30/0277 |
| | | | 705/14.73 |
| 2015/0234796 A1* | 8/2015 | Williams | G06F 40/143 |
| | | | 715/229 |
| 2015/0245103 A1* | 8/2015 | Conte | G06Q 30/0643 |
| | | | 725/60 |
| 2015/0264450 A1* | 9/2015 | Jung | H04N 21/23418 |
| | | | 725/32 |
| 2015/0296250 A1* | 10/2015 | Casper | G06Q 30/0267 |
| | | | 725/34 |
| 2015/0350739 A1 | 12/2015 | Miller et al. | |
| 2016/0313983 A1* | 10/2016 | Davidchuk | G06F 8/38 |
| 2017/0245112 A1* | 8/2017 | Mah Lok | H04W 4/023 |
| 2018/0316449 A1 | 11/2018 | Wang | |
| 2020/0336804 A1 | 10/2020 | Cui et al. | |
| 2020/0401281 A1 | 12/2020 | Shu | |
| 2021/0158371 A1* | 5/2021 | Dhotey | G06Q 30/018 |
| 2022/0148072 A1 | 5/2022 | Jiang | |
| 2022/0217444 A1* | 7/2022 | Crossley | G06F 16/78 |
| 2022/0385984 A1 | 12/2022 | Yuan et al. | |

FOREIGN PATENT DOCUMENTS

| | | | |
|---|---|---|---|
| CN | 107995516 | A | 5/2018 |
| CN | 110221734 | A | 9/2019 |
| CN | 110850983 | A | 2/2020 |
| CN | 111294637 | A | 6/2020 |
| CN | 111738801 | A | 10/2020 |
| CN | 112070569 | A | 12/2020 |
| CN | 112153396 | A | 12/2020 |
| CN | 112348639 | A | 2/2021 |
| CN | 112395022 | A | 2/2021 |
| CN | 112399200 | A | 2/2021 |
| CN | 112423087 | A | 2/2021 |
| CN | 112561631 | A | 3/2021 |
| CN | 112561632 | A | 3/2021 |
| CN | 112632322 | A | 4/2021 |
| CN | 112783591 | A | 5/2021 |
| CN | 113301441 | A | 8/2021 |
| JP | 2010526497 | A | 7/2010 |
| JP | 2011087129 | A | 4/2011 |
| JP | 2016005015 | A | 1/2016 |
| JP | 2018022995 | A | 2/2018 |
| JP | 7574476 | B2 | 10/2024 |
| KR | 20100023788 | A | 3/2010 |
| KR | 20130134638 | A | 12/2013 |
| KR | 20140147906 | A | 12/2014 |
| KR | 101865545 | B1 | 6/2018 |
| KR | 20190061871 | A | 6/2019 |
| WO | 2016093565 | A1 | 6/2016 |

OTHER PUBLICATIONS

First Office Action dated Apr. 22, 2022 in CN Appl. No. 202110559456.1, English translation (19 pages).
Written Decision on Registration issued Jun. 26, 2024 in KR Appl. No. 9-5-2024-053586010, English translation (6 pages).
Notice of Reasons for Refusal issued May 28, 2024 in JP Appl. No. 2023-571800, English translation (9 pages).
European Search Report for EP Patent Application No. 22803777.6, Issued on Sep. 16, 2024, 11 pages.
Communication pursuant to Rules 70(2) and 70a(2) EPC for European Application No. 22803777.6, mailed Oct. 4, 2024, 1 page.

* cited by examiner

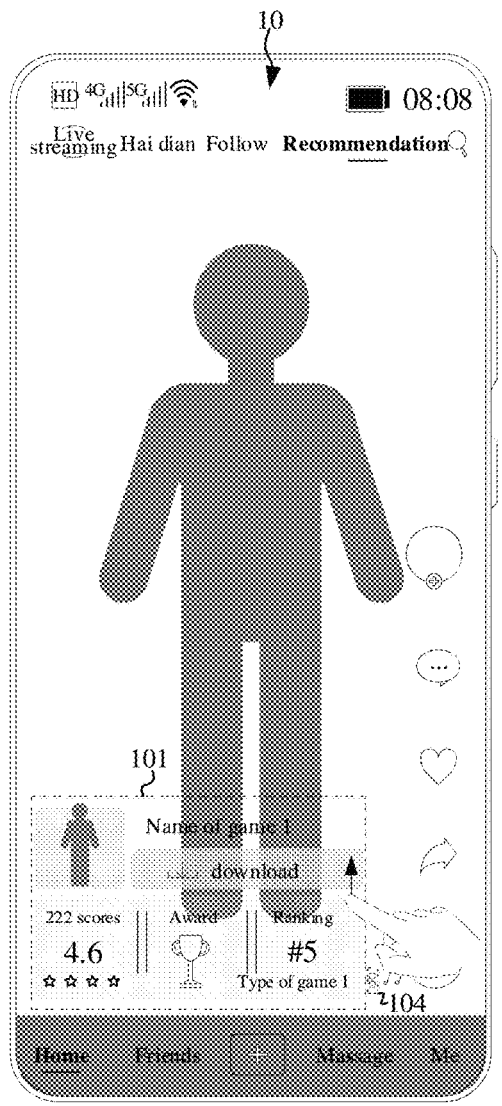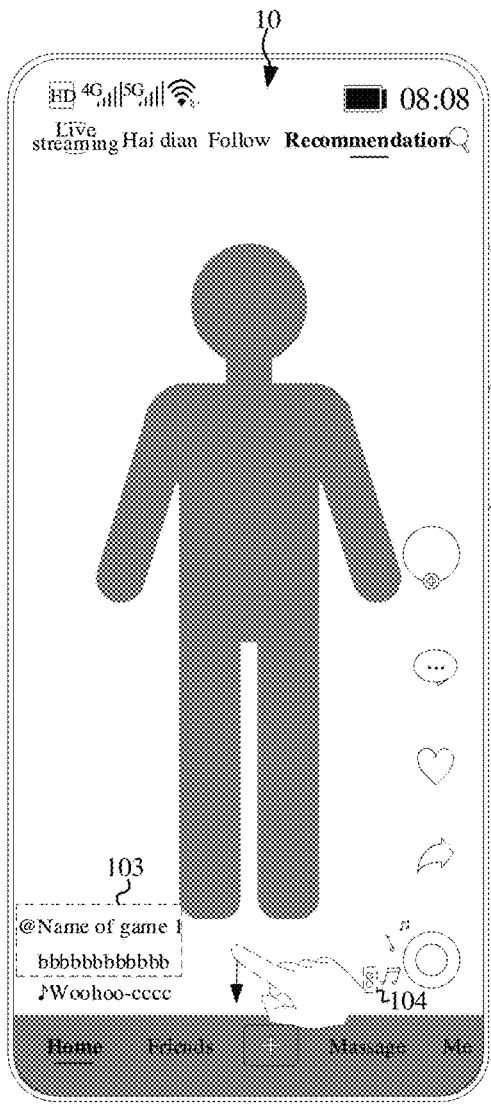
FIG. 4D  FIG. 4E

METHOD AND APPARATUS FOR INTERACTING WITH APPLICATION PROGRAM, AND ELECTRONIC DEVICE

CROSS-REFERENCE TO RELATED APPLICATIONS

The present disclosure is based on and claims the benefit of Chinese Patent Application for invention No. 202110559456.1, filed on May 21, 2021, the disclosure of which is hereby incorporated into this disclosure by reference in its entirety.

TECHNICAL FIELD

The present disclosure relates to the field of computer technology, in particular to an application interaction method, an apparatus, and an electronic device.

BACKGROUND

With the continuous development of the internet technology, applications may sequentially display introduction content and guidance contents of recommended objects in cards during the process of playing multimedia contents (such as short videos) of recommended objects in the field of, for example, game, commerce, or education, so as to show users detailed information of the recommended objects.

SUMMARY

In a first aspect, the present disclosure provides an application interaction method, comprising: playing a multimedia content of a target object; displaying an interaction component of the target object in a playing page for the multimedia content, the interaction component comprising: an interaction card and an action button integrated to the interaction card, wherein the interaction card is configured to describe introduction content of the target object, comprising: an icon of the target object, first basic information of the target object, and extension information of the target object; the action button is configured to provide an entrance to an interaction page of the target object; wherein, the first basic information is configured to describe the name and/or title of the target object.

In some embodiments, displaying an interaction component of the target object in a playing page for the multimedia content comprises: after a first preset period of time, displaying the interaction component and a return button in the playing page, the return button being configured to switch between the display of the interaction component and the display of second basic information of the target object.

In some embodiments, the method further comprises: in response to receiving a first operation triggered on the return button, switching the display of the interaction component in the playing page to the display of the second basic information; in response to receiving a second operation triggered on the return button, switching the display of the second basic information in the playing page to the display of the interaction component.

In some embodiments, displaying an interaction component of the target object in a playing page for the multimedia content comprises: after a second preset period of time, displaying the interaction component and a location identifier in a first state in the playing page, wherein the location identifier is configured to indicate that the interaction component or the second basic information of the target object is displayed in the playing page, and the location identifier in a first state is configured to represent that the interaction component is displayed in the playing page.

In some embodiments, the method further comprises: in response to receiving a third operation of sliding on the interaction component, switching the display of the interaction component in the playing page to the display of the second basic information, and switching the location identifier in a first state to a location identifier in a second state, wherein the location identifier in the second state is configured to indicate that the second basic information is displayed in the playing page; in response to receiving a fourth operation of sliding on an information display area, switching the display of the second basic information component in the playing page to the display of the interaction component, and switching the location identifier in the second state to the location identifier in the first state.

In some embodiments, the transparency of the interaction component is within a preset range. Thus, by adjusting the transparency of the interaction component, an interaction component with higher transparency and informative content can be created in a native form, which can improve the degree of integration between the interaction component and the multimedia content, reduce the sense of disturbance caused by the interaction component, make it easier for the users to focus on the content they are interested in, and enable a more native presentation of the target object in the application, thereby contributing to increasing the users' interest in understanding the target object. In some embodiments, the method further comprises: in response to receiving a fifth operation triggered on the action button, switching the playing page to the interaction page.

In some embodiments, the target object is of a game type. The method further comprises displaying extension information for providing game interaction content in a target area of the interaction card and playing a dynamic image corresponding to the game interaction content in the playing page, in response to receiving a sixth operation triggered on the target area.

In some embodiments, the target object is of an e-commerce type. The application interaction method further comprises displaying extension information for providing information on product change in a target area of the interaction card, dynamically displaying the product change in the interaction component.

In some embodiments, the playing the multimedia content of the target object comprising: playing the multimedia content of the target object in an application, wherein the playing page is a user interface of the application.

In a second aspect, the present disclosure provides an application interaction apparatus, comprising: a playback module for playing a multimedia content of a target object; a display module for displaying an interaction component of the target object in a playing page for the multimedia content, the interaction component comprising: an interaction card and an action button integrated to the interaction card, wherein the interaction card is configured to describe introduction content of the target object, comprising: an icon of the target object, a cover of the target object, first basic information of the target object, and extension information of the target object; the action button is configured to provide an entrance to an interaction page of the target object; wherein, the first basic information is configured to describe the name and/or title of the target object.

In some embodiments, the display module is particularly configured to, after a first preset period of time, display the interaction component and a return button in the playing page, the return button being configured to switch between the display of the interaction component and the display of second basic information of the target object.

In some embodiments, the display module is further configured to, in response to receiving a first operation triggered on the return button, switch the display of the interaction component in the playing page to the display of the second basic information; or in response to receiving a second operation triggered on the return button, switching the display of the second basic information in the playing page to the display of the interaction component.

In some embodiments, the display module is particularly configured to, after a second preset period of time, display the interaction component and a location identifier in a first state in the playing page, wherein the location identifier is configured to indicate that the interaction component or the second basic information of the target object is displayed in the playing page, and the location identifier in a first state is configured to represent that the interaction component is displayed in the playing page.

In some embodiments, the display module is further configured to, in response to receiving a third operation of sliding on the interaction component, switch the display of the interaction component in the playing page to the display of the second basic information, and switching the location identifier in the first state to a location identifier in a second state, wherein the location identifier in the second state is configured to indicate that the second basic information is displayed in the playing page; or in response to receiving a fourth operation of sliding on an information display area, switching the display of the second basic information component in the playing page to the display of the interaction component, and switching the location identifier in the second state to the location identifier in the first state.

In some embodiments, the transparency of the interaction component is within a preset range.

In some embodiments, the display module is further configured to, in response to receiving a fifth operation triggered on the action button, switch the playing page to the interaction page.

In some embodiments, the target object is of a game type. The playback module is further configured to display extension information for providing game interaction content in a target area of the interaction card, in response to receiving a sixth operation triggered on the target area, playing a dynamic image corresponding to the game interaction content in the playing page. In some embodiments, the target object is of an e-commerce type. The display module is further configured to display extension information for providing information on product change in a target area of the interaction card, dynamically displaying the product change in the interaction component.

In some embodiments, the playback module is configured to play the multimedia content of the target object in an application, wherein the playing page is a user interface of the application.

In a third aspect, the present disclosure provides an electronic device, comprising: a memory and a processor; wherein the memory is configured to store program instructions; the processor is configured to invoke the program instructions in the memory to cause the electronic device to perform the application interaction method of the first aspect and any embodiment of the first aspect.

In a fourth aspect, the present disclosure provides a non-transitory computer storage medium storing computer instruction that, when being executed by an electronic device, cause the electronic device to perform the application interaction method of the first aspect and any embodiment of the first aspect.

In a fifth aspect, the present disclosure provides a computer program product that when executed on a computer, causes the computer to perform the application interaction method of the first aspect and any embodiment of the first aspect.

In a sixth aspect, the present disclosure provides a chip system, comprising: a processor; wherein the processor, when executing computer instructions stored in a memory, causes an electronic device to perform the application interaction method of the first aspect and any embodiment of the first aspect.

In a seventh aspect, the present disclosure provides a computer program, comprising: instructions that, when executed by a processor, cause the processor to perform the application interaction method of the first aspect and any embodiment of the first aspect.

BRIEF DESCRIPTION OF THE DRAWINGS

Herein, the accompanying drawings, which are incorporated in and constitute a part of this specification, illustrate embodiments of the present disclosure and, together with the description, serve to explain the principles of the present disclosure.

In order to more clearly explain the embodiments of the present invention or the technical solutions in the prior art, a brief introduction will be given below for the drawings required to be used in the description of the embodiments or the prior art. It is obvious that, for a person skilled in the art, he or she may also acquire other drawings according to such drawings on the premise that no inventive effort is involved.

FIGS. 4A to 4E are schematic diagrams of human-computer interaction interfaces provided in some embodiments of the present disclosure.

DETAILED DESCRIPTION

Figure 1:
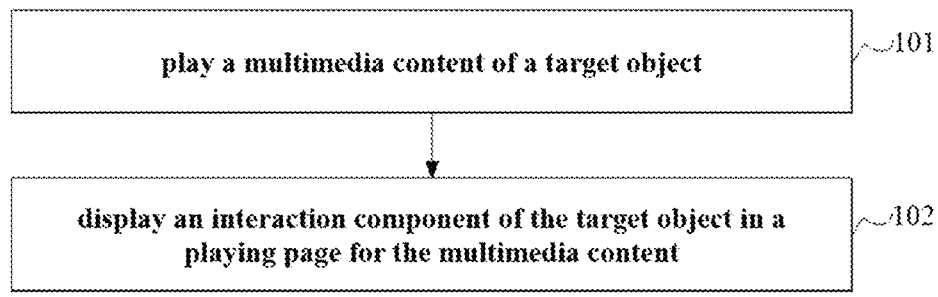
FIG. 1 is a flowchart of an application interaction method provided in some embodiments of the present disclosure.

In order to better understand the above objects, features and advantages of the present disclosure, the scheme of the present disclosure will be further described below. It should be noted that, in the case of no conflict, the embodiments and the features of the embodiments of the present disclosure may be combined with each other.

Many specific details are set forth in the following description to facilitate a full understanding of the present disclosure, but the present disclosure can also be implemented in other ways different from those described herein. Obviously, embodiments described in the description are only some embodiments of the present disclosure, and are not all of embodiments thereof.

In some embodiments, the present disclosure provides an application interaction method, an apparatus, a device, a non-transitory computer storage medium, and a computer program product, which can integrate an interaction card and an action button into an interaction component to avoid disturbing the playback of multimedia content by displaying the interaction card and the action button at different times. In addition, a more informative introduction of the target object can be comprised in the interaction component to enable users to quickly and comprehensively understand the target object. As a result, the display of the interaction card and the action button is optimized, and the degree of integration between the interaction component and the multimedia content can be improved, which is beneficial for users to focus on the content they are interested in, enabling a more native and vivid presentation of the target object in the application, and thereby contributing to increasing the users' interest in understanding the target object.

In some embodiments, the interaction card is an area in a user interface of an application. For example, the interaction card comprises at least one region for displaying the introduction content of the target object comprising an icon of the target object, basic information of the target object, and extension information of the target object.

In some embodiments, the interaction component is an area in a user interface of an application. For example, the interaction component comprises a plurality of regions for displaying the introduction content of the target object and the action button.

In addition, the transparency of the interaction component is within a preset range, allowing them to be visually integrated into the multimedia content, which can reduce the sense of boundaries of the interaction component. Thus, by adjusting the transparency of the interaction component, an interaction component with higher transparency and informative content can be created in a native form, which can improve the degree of integration between the interaction component and the multimedia content, and reduce the sense of disturbance caused by the interaction component.

The application interaction method of the present disclosure is executed by an electronic device. The electronic device can comprise a mobile phone, a tablet computer, a wearable electronic device, an on-board device, an augmented reality (AR)/virtual reality (VR) device, a notebook computer, an ultra mobile personal computer (UMPC), a netbook, a personal digital assistant (PDA), a smart TV, a smart screen, a HDTV, a 4K TV, a smart speaker, and a smart projector. The present disclosure is not limited to any specific type of the electronic device.

The type of the operating system of the electronic device is not limited in the present disclosure. For example, the operating system may be Android, Linux, Windows, IOS, etc.

The sequential appearance and a sense of boundary of cards corresponding to introduction content and guide content in a playing page may visually disturb the playback of the multimedia content. In addition, the cards corresponding to introduction content and guide content can present only a smaller amount of information each time, making it difficult for users to fully understand the recommended object and not conducive to arousing users' interest in the recommended object.

In order to solve or at least partially solve the above technical problem, the present disclosure provides an application interaction method, an apparatus, and an electronic device.

Firstly, some terms used in the disclosure will be explained to facilitate the understanding of those skilled in the art.

Based on the foregoing description, using an electronic device in some embodiments of the present disclosure as an example, the application interaction method provided in the present disclosure will be described in detail in conjunction with the accompanying drawings and specific application scenarios.

FIG. 1 is a flowchart of an application interaction method provided in some embodiments of the present disclosure. As shown in FIG. 1, the application interaction method provided in the present disclosure may comprise the following steps.

In S101, a multimedia content of a target object is played. For example, the multimedia content of the target object is played in an application, wherein the playing page is a user interface of the application.

In S102, an interaction component of the target object is displayed in a playing page for the multimedia content.

Through the method provided in the first aspect, the electronic device can play back a multimedia content of a target object in an application. In the playing page for the multimedia content, the electronic device can display an interaction component of the target object. An interaction card and an action button are integrated in the interaction component, and the interaction component also comprises an introduction content of the target object, comprising an icon of the target object, a cover of the target object, and first basic information of the target object, as well as extension information of the target object. As a result, by integrating the interaction card and enriching the content of the interaction component, an interaction component with a native and vivid appearance can be created. This may optimize the display and appearance of the interaction card and the action button, as well as improve the degree of integration between the interaction component and the multimedia content. Therefore, users can focus on the content they are interested in, enabling a more native presentation of the target object in the application, and thereby contributing to increasing the users' interest in understanding the target object. For the beneficial effects of the above second aspect and the application interaction apparatus provided in each possible design of the above second aspect, reference can be made to the beneficial effects of the first aspect and each embodiment of the first aspect, which will not be repeated herein.

The electronic device can play back a multimedia content of a target object in a playing page.

The playing page is a page of the application for displaying a multimedia content of the target object. The target object is the object recommended by the application to the user (i.e. a recommended object). The target object may comprise, but is not limited to: a game type object, an e-commerce type object, and an education type object. The multimedia content of the target object is configured to display detailed information of the target object. The application, the specific implementations of the playing page and the target object are not limited in the present disclosure.

For example, if the target object is of a game type, the multimedia content of the target object may be a game introduction video or a game trial video. If the target object is of an e-commerce type, the multimedia content of the target object may be a product exhibition video or a product trial video. If the target object is of an education type, the multimedia content of the target object may be a course introduction video or a course trial video.

Moreover, the electronic device can display an interaction component of the target object in the playing page.

The interaction component may comprise: an integrated interaction card and an action button. In some embodiments, the interaction card and the action button are integrated into the interaction component.

The interaction card is configured to present an introduction content of the target object. The specific introduction content of the target object is not limited in the present disclosure. In some embodiments, the introduction content of the target object may comprise: an icon of the target object, first basic information of the target object, and extension information of the target object.

Figure 2:
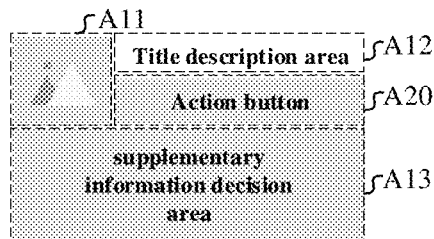
FIG. 2 is a schematic diagram of an interaction component in a style provided in some embodiments of the present disclosure.

FIG. 2 is a schematic diagram showing an interaction component in a style provided in some embodiments of the present disclosure. For the sake of illustration, FIG. 2 shows an example, in which the electronic device is a mobile phone, and the application installed on the mobile phone is a short video and social App.

As shown in FIG. 2, the presentation style of the interactive component may comprise: a first region A11, a second region A12, a third region A13, and a fourth region A20. The first region A11 is configured to display an icon of the target object, such as a cover. The second region A12 is configured to display first basic information of the target object, such as the target object's name and/or title. The third region A13 is configured to display extension information of the target object, and the fourth region A20 is configured to display an action button.

Figures 3A, 3B:
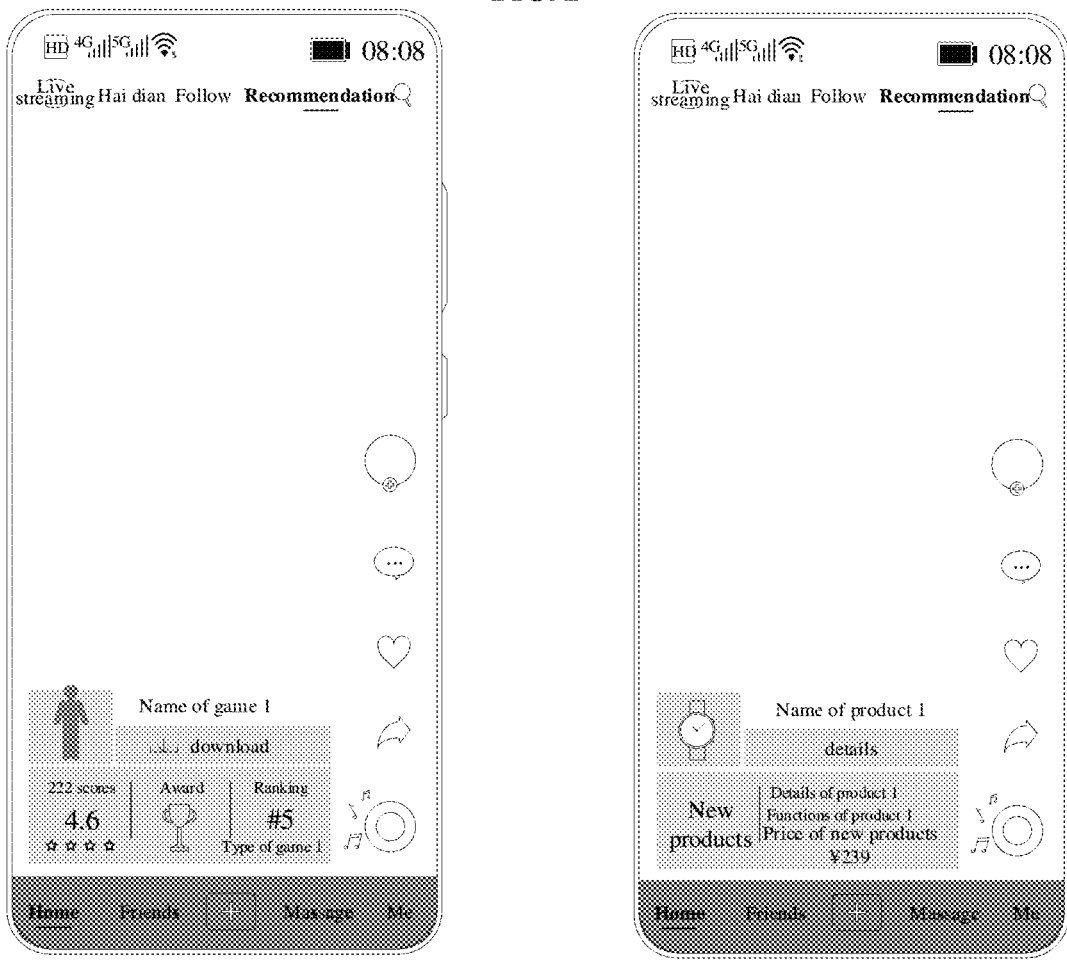
FIGS. 3A to 3C are schematic diagrams of the interaction component in different styles suitable for target objects of different types provided in some embodiments of the present disclosure.
Figure 3C:
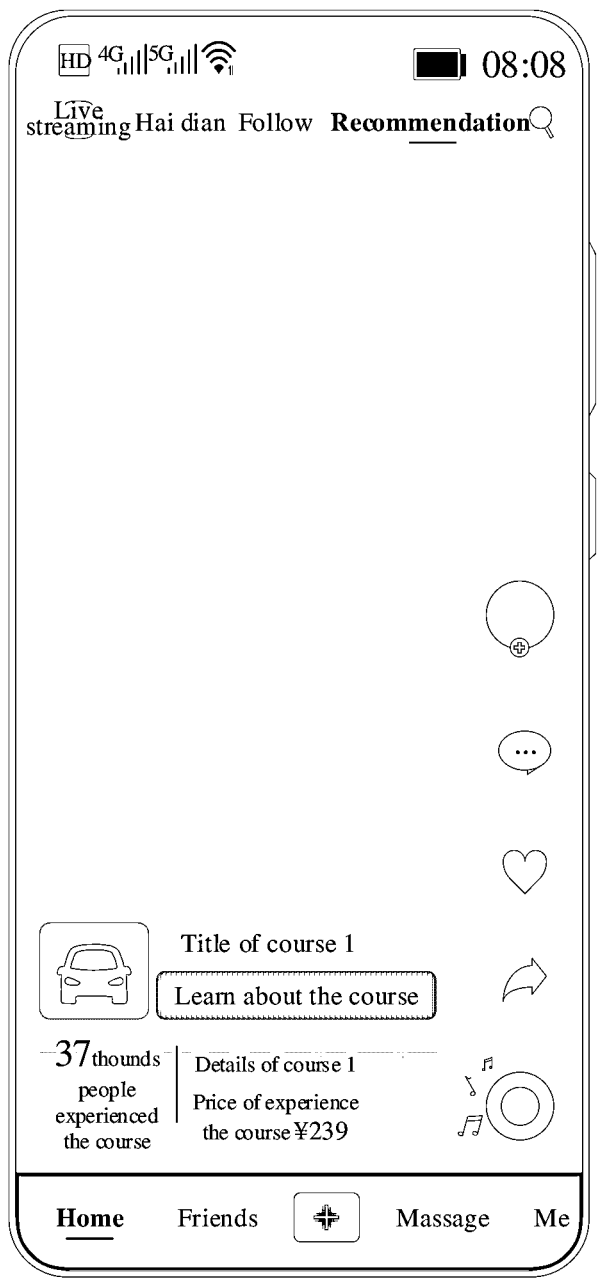

Referring to FIGS. 3A to 3C, FIGS. 3A to 3C are schematic diagrams of the interaction component in different styles suitable for target objects of different types provided in some embodiments of the present disclosure. For the sake of illustration, FIGS. 3A to 3C show an example, in which the electronic device is a mobile phone, and the application installed on the mobile phone is a short video and social App.

If the target object is of a game type, the interaction component can adopt, for example, the presentation style shown in FIG. 3A. If the target object is of an e-commerce type, the interaction component can adopt, for example, the presentation style shown in FIG. 3B. If the target object is of an education type, the interaction component can adopt, for example, the presentation style shown in FIG. 3C.

The action button is configured to provide an entrance to an interaction page of the target object. The interaction page of the target object is another page of the application, which is configured to display interaction situations with the target object. The specific implementation of the interaction page of the target object is not limited in the present disclosure.

For example, if the target object is of a game type, the interaction page of the target object may be a game download page. If the target object is of an e-commerce type, the interaction page of the target object may be a product purchase page. If the target object is of an education type, the interaction page of the target object may be a course purchase page.

In some embodiments, in response to receiving a fifth operation triggered on the action button, the electronic device switches the playing page to the interaction page. As a result, the electronic device can show the user interactions with the target object, enriching the way of recommending target objects in an application. The fifth operation may comprise, but is not limited to, a clicking operation, a double clicking operation, a sliding operation, a long press operation, etc.

The application interaction method provided in this disclosure allows the electronic device to play a multimedia content of a target object. In the playing page for the multimedia content, the electronic device may display an interaction component of the target object, which comprises an interaction card and an action button integrated, and contains introduction content of the target object, such as an icon of the target object, a cover of the target object, first basic information of the target object, and extension information of the target object. Thus, by integrating an interaction card and an action button, and enriching the content rendered in the interaction component, an interaction component with a native and conspicuous appearance can be created, which may optimize the display of the interaction card and the action button, improve the degree of integration between the interaction component and the multimedia content, and therefore is beneficial for users to focus on the content they are interested in, enabling a more native presentation of the target object in the application, and thereby contributing to increasing the users' interest in understanding the target object.

Based on the description of the above embodiments, the transparency of the interaction component is within a preset range. In this way, the boundary sense of the interaction component can be weakened, allowing the interaction component to be visually integrated into the multimedia content.

The present disclosure has no limitations on the preset range. In some embodiments, the transparency of the playing page is set to 0%. Therefore, the preset range may be "greater than or equal to 90%", so that the transparency of the interaction component is less different from or is equal to the transparency of the playing page, making the interaction component visually a part of the displayed multimedia content.

Based on the description of the above embodiments, the electronic device can display the interaction component of the target object in various ways in the playing page for the multimedia content.

In some embodiments, the electronic device may display the interaction component and a return button in the playing page after a first preset period of time.

The present disclosure has no limitations on the specific value of the first preset period of time. The return button is configured to switch between the display of the interaction component and the display of the second basic information of the target object. This disclosure has no limitations on the shape, position, and size of the return button. This disclosure has also no limitations on the style, position, shape, and size of the second basic information displayed in the playing page.

If the interaction component is displayed in the playing page and the electronic device receives a first operation triggered on the return button, the electronic device switches the display of the interaction component in the playing page to the display of the second basic information.

If the second basic information is displayed in the playing page and the electronic device receives a second operation triggered on the return button, the electronic device switches the display of the second basic information in the playing page to the display of the interaction component.

The first and second operations may comprise, but are not limited to, clicking, double clicking, sliding, and long pressing, etc. The implementation of the animation effect used for the switch operation is not specifically limited in the present disclosure. In some embodiments, an animation effect of flipping up and down between the interaction component and the second basic information can be used for the switch operation.

Thus, the electronic device can achieve a smooth switch between the interaction component and the second basic information by a trigger operation on the return button, thereby enabling a smooth and less disruptive switching effect.

In other embodiments, the electronic device may display the interaction component and a location identifier in a first state in the playing page after a second preset period of time.

The present disclosure has no limitations on the specific length of the second preset period of time. The location identifier is configured to indicate that the interaction component or the second basic information of the target object is displayed in the playing page, and the location identifier in the first state is configured to indicate that the interaction component is displayed in the playing page. This disclosure has no limitations on the shape, position, and size of the location identifier.

If the interaction component is displayed in the playing page and the electronic device receives a third operation of sliding on the interaction component, the electronic device switches the display of the interaction component in the playing page to the display of the second basic information, and switches the location identifier in the first state to a location identifier in a second state. The location identifier in the second state is configured to indicate that the second basic information is displayed in the playing page.

If the second basic information is displayed in the playing page and the electronic device receives a fourth operation of sliding on an information display area, the electronic device switches the display of the second basic information component in the playing page to the display of the interaction component, and switches the location identifier in the second state to the location identifier in the first state.

The third and fourth operations may comprise, but are not limited to, clicking, double clicking, sliding, and long pressing, etc. The implementation of the animation effect used for the switch operation is not specifically limited in the present disclosure. In some embodiments, an animation effect of flipping up and down between the interaction component and the second basic information can be used for the switch operation.

Thus, the electronic device can achieve a smooth switch between the interaction component and the second basic information, through the trigger operation in the playing page, thereby enabling a smooth and less disruptive switch effect. In addition, it can clearly convey the information currently displayed in the playing page to the user by means of the state of the location identifier.

Below, an implementation of switching between the interaction component and the second basic information in the present disclosure will be introduced with reference to FIGS. 4A to 4E.

For the sake of illustration, FIGS. 4A to 4E show an example, in which the electronic device is a mobile phone, the application installed on the mobile phone is a short video and social App (App 1), and the target object (target object 1) in App 1 is a game type object.

Referring to FIGS. 4A to 4E, FIGS. 4A to 4E are schematic diagrams of human-computer interaction interfaces provided in some embodiments of the present disclosure.

Figure 4A:
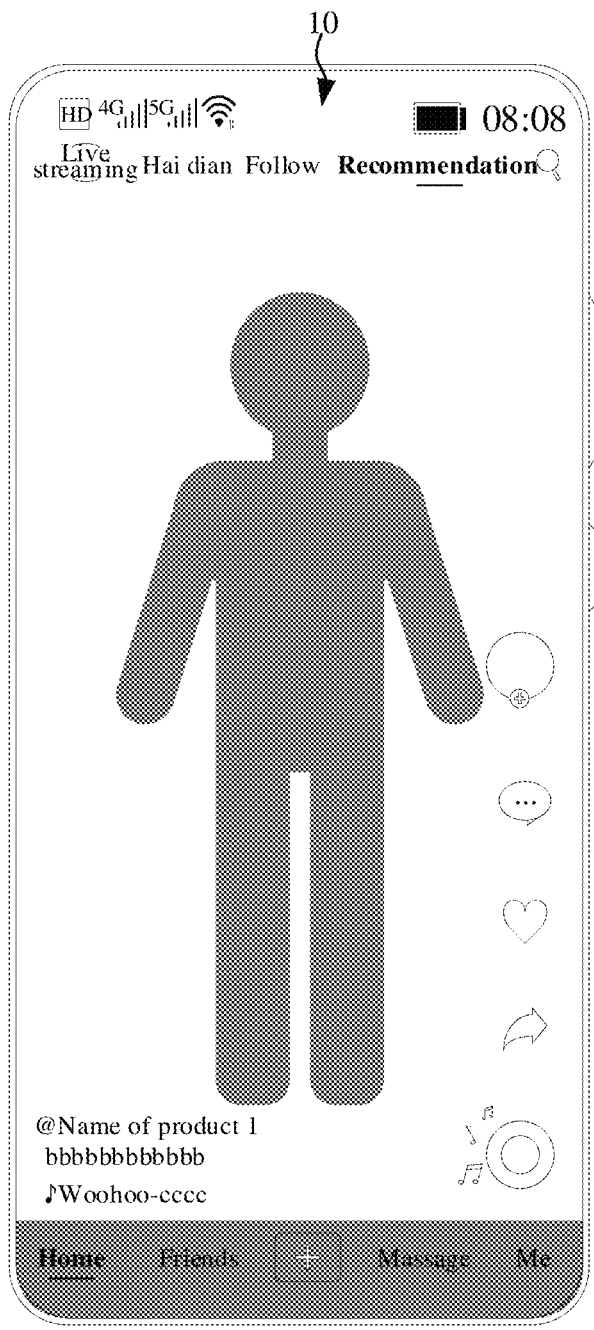

The App 1 can display an exemplary user interface 10 shown in FIG. 4A on the mobile phone, which is configured to play back a multimedia content of the target object 1.

Figure 4B:
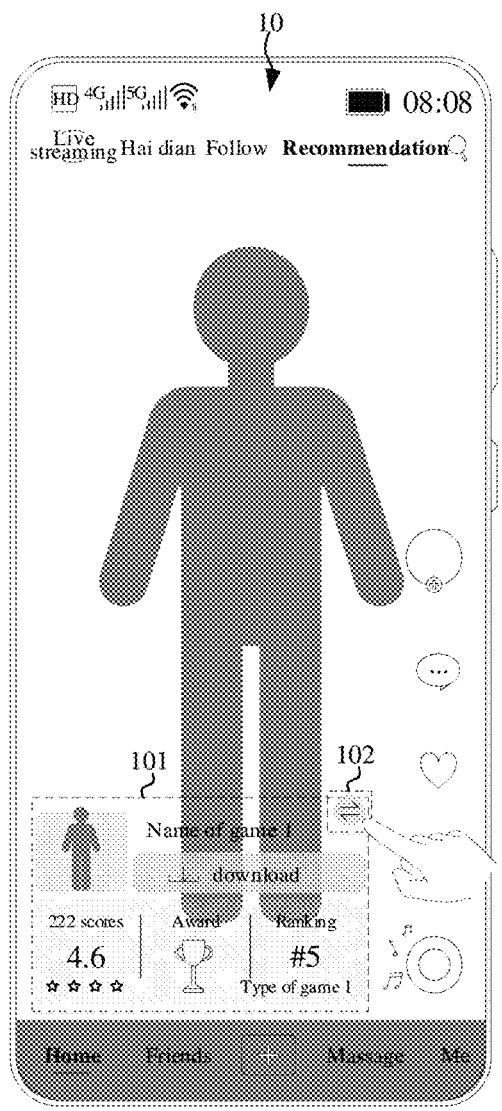

After a first preset period of time, the App 1 can display an exemplary interaction component 101 and a return button 102 on the user interface 10, as shown in FIG. 4B.

Figure 4C:
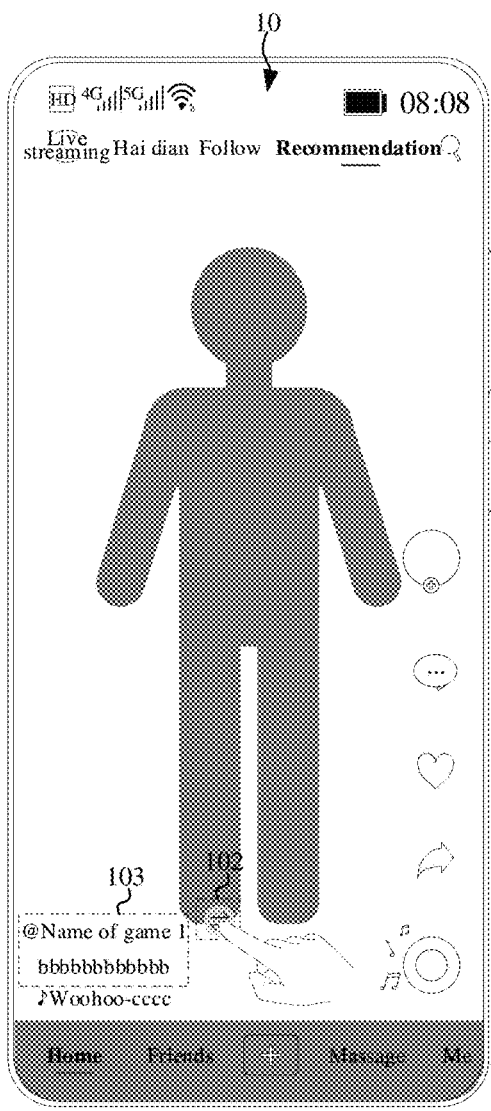

In response to receiving a first operation such as a click performed by the user 1 on the return button 102 shown in FIG. 4B, the App 1 may display exemplary basic information 103 and a return button 102 on the user interface 10, as shown in FIG. 4C. The basic information 103 comprises a name. It should be noted that the basic information 103 may also comprise a title, which can be located below the name.

In response to receiving a second operation such as a click performed by the user 1 on the return button 102 shown in FIG. 4C, the App 1 may display an exemplary interaction component 101 and a return button 102 on the user interface 10, as shown in FIG. 4B.

Thus, the mobile phone can achieve a smooth switch between the interaction component 101 and the basic information 103 by a trigger operation on the return button, thereby enabling a smooth and less disruptive switch effect.

After a second preset period of time, the App 1 can display an exemplary interaction component 101 and a location identifier 104 in a first state on the user interface 10, as shown in FIG. 4D.

In response to receiving a third operation such as a slide-up operation performed by the user 1 on the interaction component 101 shown in FIG. 4D, the App 1 may display exemplary basic information 103 and a location identifier 104 in a second state on the user interface 10, as shown in FIG. 4E. The basic information 103 comprises a name. It should be noted that the basic information 103 may also comprise a title, which can be located below the name.

In response to receiving a fourth operation such as a slide-down operation performed by the user 1 on the return button 102 shown in FIG. 4E, the App 1 may display an exemplary interaction component 101 and a location identifier 104 in a first state on the user interface 10, as shown in FIG. 4D.

In summary, the electronic device can achieve a smooth transition between the switch component 101 and the basic information 103 through sliding operations in an area where the interaction component 101 or the basic information 103 is located, thereby enabling a smooth and less disruptive switch effect. In addition, whether the information currently displayed in the playing page is the interaction component 101 or the basic information 103 can be indicated by the state of the location identifier 104.

Based on the description of the above embodiment, the second basic information of the target object is configured to display basic information of the target object, such as its name/title, which can introduce the target object to the user from a conceptual perspective. The title can be understood as an advertising slogan, descriptive information or a reminder of the target object. In addition, the extension information of the target object is configured to display personalized information of the target object, which is conductive to provide a more comprehensive introduction to the target object in combination with the second basic information of the target object. For ease of explanation, an area in which the extension information is displayed in the interaction card can be considered as a target area.

The target object is of a game type, extension information for providing a game interaction content can be displayed in the target area. Thus, in response to receiving a sixth operation triggered on the target area, the electronic device can play back a dynamic image corresponding to the game interaction content in the playing page.

This disclosure has no limitations on the location, size, and shape of the target area. In some embodiments, the target area may be the area A13 shown in FIG. 2. The sixth operation may comprise, but is not limited to, a clicking operation, a double clicking operation, a sliding operation, a long press operation, etc. The implementation of the game interaction content and the dynamic image is not specifically limited in the present disclosure.

In the case where the game interaction content is extension information that provides a game blind box, after the electronic device receives a sixth operation triggered on the target area, the electronic device displays a dynamic image of getting game props from a game blind box.

The dynamic image mentioned above can be configured to show a procedure from opening the game blind box to displaying a result. This disclosure has no limitations on the parameters of the dynamic image, such as its image content and playback duration.

Thus, if the target object is of a game type, by using the extension information of the target object in the interaction card, the electronic device can provide users with a linkage experience in the blind box scenario. This allows users to have a visual experience of opening a game blind box, which is beneficial for increasing users' interest in understanding the target object.

Below, a process of achieving, by the electronic device of the present disclosure, a linkage experience in the blind box scenario will be introduced with reference to FIGS. 5A to 5C.

Figures 5A, 5B:
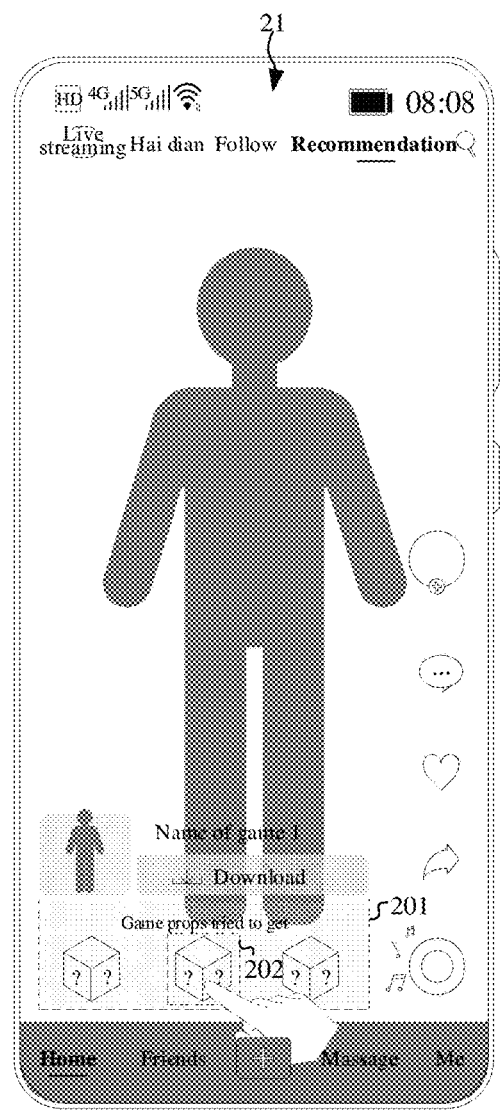
FIGS. 5A to 5C are schematic diagrams of human-computer interaction interfaces provided in some embodiments of the present disclosure.
Figure 5C:
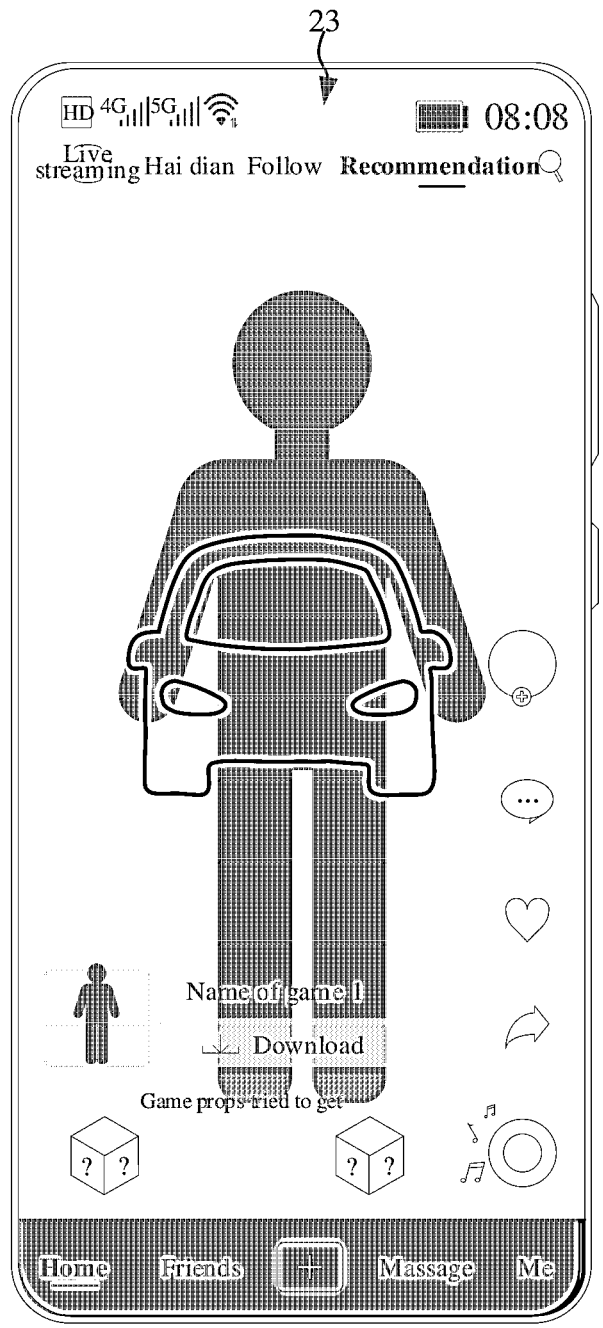

For the sake of illustration, FIGS. 5A to 5C show an example, in which the electronic device is a mobile phone, the application installed on the mobile phone is a short video and social App (App 1), and the target object (target object 1) in App 1 is a game type object.

Referring to FIGS. 5A to 5C, FIGS. 5A to 5C are schematic diagrams of human-computer interaction interfaces provided by an embodiment of the present disclosure.

The App 1 can display an exemplary user interface 21 shown in FIG. 5A on the mobile phone, which is configured to play back a multimedia content of the target object 1, and to display a target area 201 in the interaction component. The target area 201 is configured to display extension information of the target object 1. The target area 201 may comprise: a game blind box icon 202 for triggering the activation of getting game props from a game blind box.

In response to receiving a sixth operation such as a click performed by the user 1 on the game blind box icon 202 shown in FIG. 5A, the App 1 may sequentially display an exemplary user interface 22 shown in FIG. 5B and an exemplary user interface 23 shown in FIG. 5C. The user interface 22 and the user interface 23 are configured to show a dynamic image of getting game props from a game blind box.

In summary, by a trigger operation on the game blind box icon 202, the mobile phone can show users a dynamic image of getting game props from a game blind box in the playing page, thereby achieving a linkage experience in the blind box scenario and increasing users' interest in understanding the target object.

In the case where the game interaction content is extension information that provides a glasses-free 3D animation effect, such as a 3D animation displayed when a game character completes a game process, in response to receiving a sixth operation triggered on the target area, the electronic device play back a multimedia content for a third preset period of time in accordance with the glasses-free 3D animation effect in the playing page.

The dynamic image mentioned above is a multimedia content that is played for a third preset period of time according to the glasses-free 3D animation effect. The glasses-free 3D animation effect mentioned above is configured to achieve a stereoscopic visual effect in the game process of the target object. This disclosure has no limitations on the specific implementation method of the glasses-free 3D animation effect and the specific value of the third preset period of time.

Thus, if the target object is of a game type, by using the extension information of the target object in the interaction card, the electronic device can provide users with a linkage experience in the glasses-free 3D scenario, allowing users to have a visual experience of a glasses-free 3D animation effect, which is beneficial for increasing users' interest in knowing the target object.

Below, a process of achieving, by the electronic device of the present disclosure, a linkage experience in the glasses-free 3D scenario will be introduced with reference to FIGS. 6A to 6B.

Figure 6A:
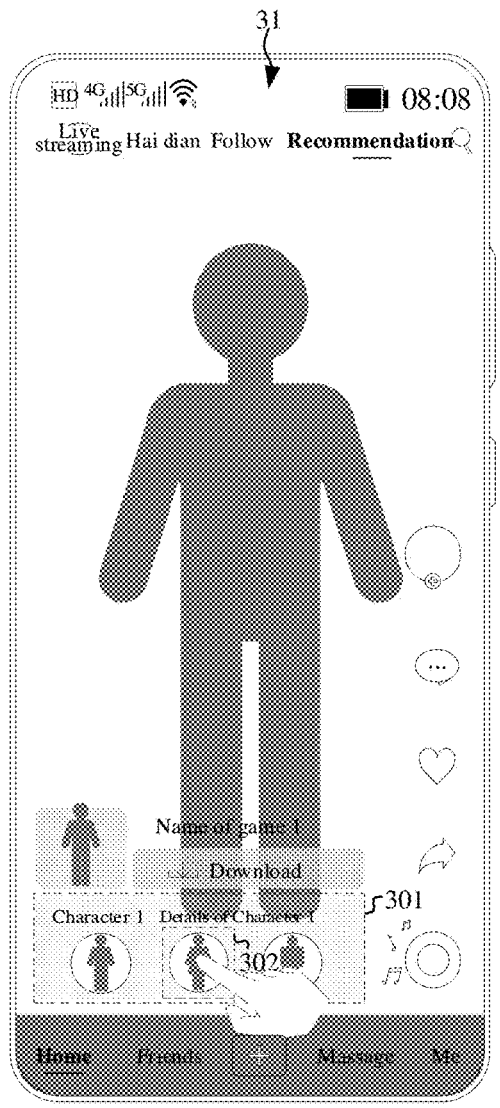
FIGS. 6A to 6B are schematic diagrams of human-computer interaction interfaces provided in some embodiments of the present disclosure.
Figure 6B:
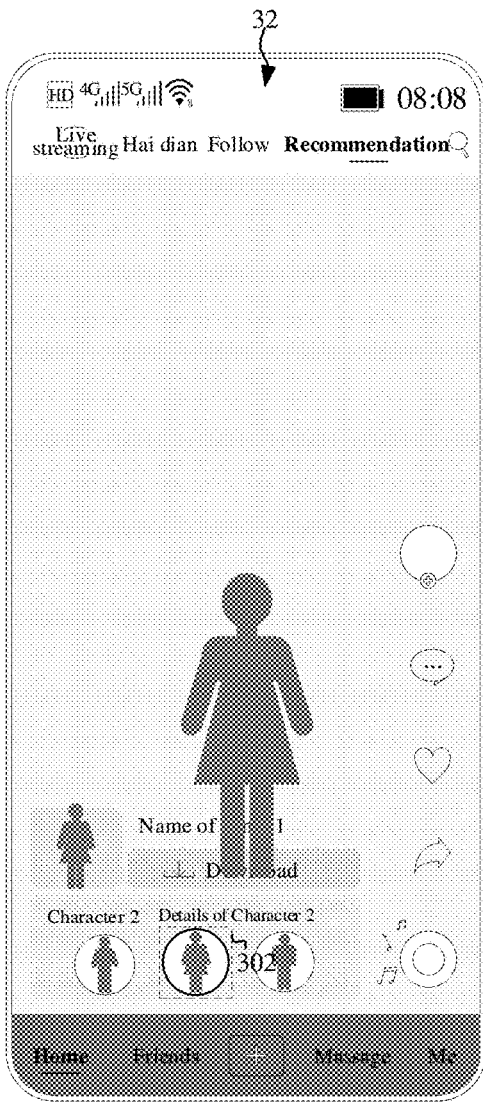

For the sake of illustration, FIGS. 6A to 6B show an example, in which the electronic device is a mobile phone, the application installed on the mobile phone is a short video and social App (App 1), and the target object (target object 1) in App 1 is a game type object.

Referring to FIGS. 6A to 6B, FIGS. 6A to 6B are schematic diagrams of human-computer interaction interfaces provided by an embodiment of the present disclosure.

The App 1 can display an exemplary user interface 31 shown in FIG. 6A on the mobile phone, which is configured to play back a multimedia content of the target object 1, and to display a target area 301 in the interaction component. The target area 301 is configured to display extension information of the target object 1. The target area 301 may comprise: a game character icon 302, which is configured to trigger a displaying of a glasses-free 3D animation effect when the role of a corresponding game character (illustrated by character 2 in FIG. 6A) is selected.

In response to receiving a sixth operation such as a click performed by the user 1 on the game character icon 302 shown in FIG. 6A, the App 1 may display an exemplary user interface 32 shown in FIG. 6B on the mobile phone. The user interface 32 is configured to display an image in a multimedia content for a third preset period of time according to a glasses-free 3D animation effect of the game character 2.

In summary, by a trigger operation on the game character icon 302, the mobile phone can display a multimedia content in the playing page for a third preset period of time in accordance with a glasses-free 3D animation effect of a corresponding game character, thereby achieving a linkage experience in the glasses-free 3D scenario and increasing users' interest in knowing the target object.

In the case where the game interaction content is extension information for game character switching, after the electronic device receives a sixth operation triggered on the target area, the electronic device display a multimedia content for a fourth preset period of time in the playing page based on a game character after role switching.

The dynamic image mentioned above is a multimedia content that is played for a fourth preset period of time based on a game character after role switching. The present disclosure has no limitations on the specific length of the fourth preset period of time.

Thus, if the target object is of a game type, by using the extension information of the target object in the interaction card, the electronic device can provide users with a linkage experience in the role switching scenario, allowing users to have a visual experience of role switching, which is beneficial for increasing users' interest in knowing the target object.

Below, a process of achieving, by the electronic device of the present disclosure, a linkage experience in the role switching scenario will be introduced with reference to FIGS. 7A to 7B.

Figure 7A:
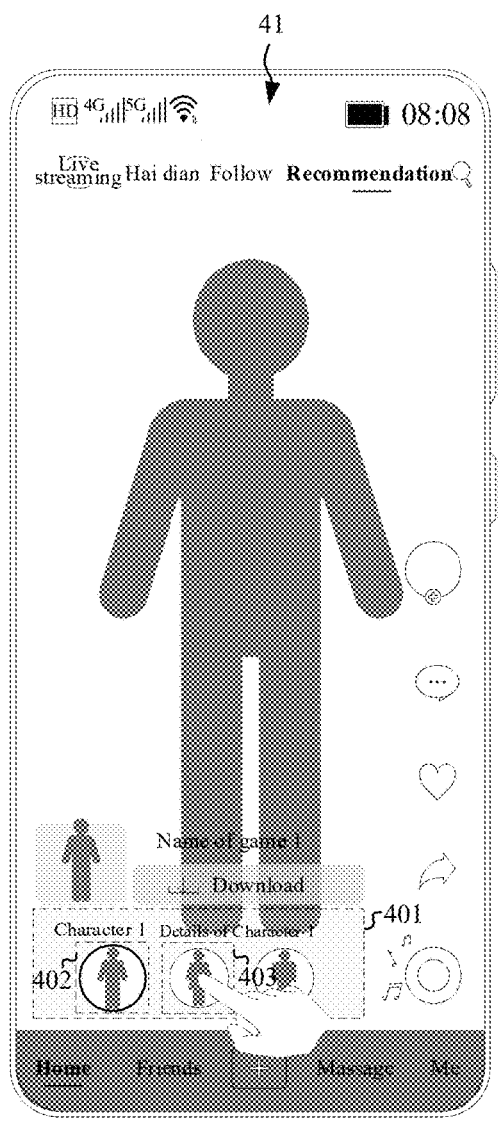
FIGS. 7A to 7B are schematic diagrams of human-computer interaction interfaces provided in some embodiments of the present disclosure.
Figure 7B:
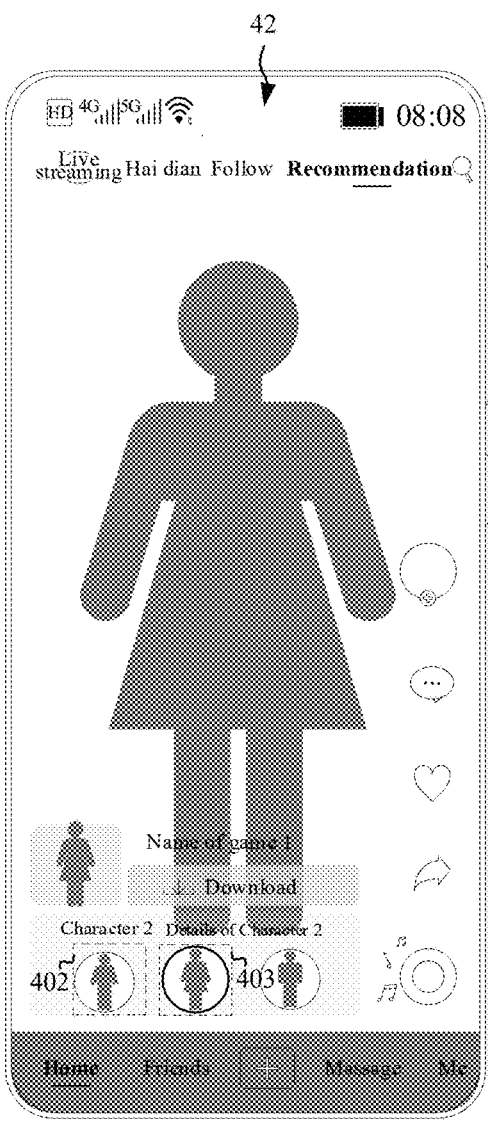

For the sake of illustration, FIGS. 7A to 7B show an example, in which the electronic device is a mobile phone, the application installed on the mobile phone is a short video and social App (App 1), and the target object (target object 1) in App 1 is a game type object.

Referring to FIGS. 7A to 7B, FIGS. 7A to 7B are schematic diagrams of human-computer interaction interfaces provided by an embodiment of the present disclosure.

The App 1 can display an exemplary user interface 41 shown in FIG. 7A on the mobile phone, which is configured to play back a multimedia content of the target object 1, and to display a target area 401 in the interaction component. The target area 401 is configured to display extension information of the target object 1. The target area 401 may comprise: a game character icon 402 and a game character icon 403, which are configured to trigger switching between game characters corresponding to game character icons. The game character icon 402 is the avatar icon of a character 1, and the game character icon 403 is the avatar icon of a character 2.

In FIG. 7A, the multimedia content is played back in the user interface 41 based on the character 1, wherein the game character icon 402 is highlighted and the game character icon 403 is not highlighted.

In response to receiving a sixth operation such as a click performed by the user 1 on the game character icon 303 shown in FIG. 7A, the App 1 may display an exemplary user interface 42 shown in FIG. 7B on the mobile phone. The user interface 42 is configured to display an image in the multimedia content for a fourth preset period of time based on the character 2. Moreover, the game character icon 402 is not highlighted, while the game character icon 403 is highlighted in the target area 401.

In summary, by a trigger operation on the game character icon 403, the mobile phone can display the multimedia content based on a corresponding game character in the playing page for a fourth preset period of time, thereby achieving a linkage experience in the character switching scenario and increasing users' interest in knowing the target object.

In the case where the target object is an e-commerce type object, extension information can be displayed in the target area to provide information on product change. Thus, the electronic device can dynamically display product change in the interaction component.

The product change may represent the prices of a product over a period of time, or the sales of the product over a period of time, or a comparison of products in the same category.

Thus, if the target object is of a game type, by using the extension information of the target object in the interaction card, the electronic device can provide users with a linkage experience in the product change presentation scenario, allowing users to have a visual experience of product change, which is beneficial for increasing users' interest in knowing the target object.

It should be noted that in addition to a target object that is an e-commerce type object, in the case where the target object is an object of other types such as a game type object or an education type object, the electronic devices can also achieve a linkage experience in the product change presentation scenario.

Below, a process of achieving, on the electronic device of the present disclosure, a linkage experience in the product change presentation scenario will be introduced with reference to FIGS. 8A to 8B.

Figure 8A:
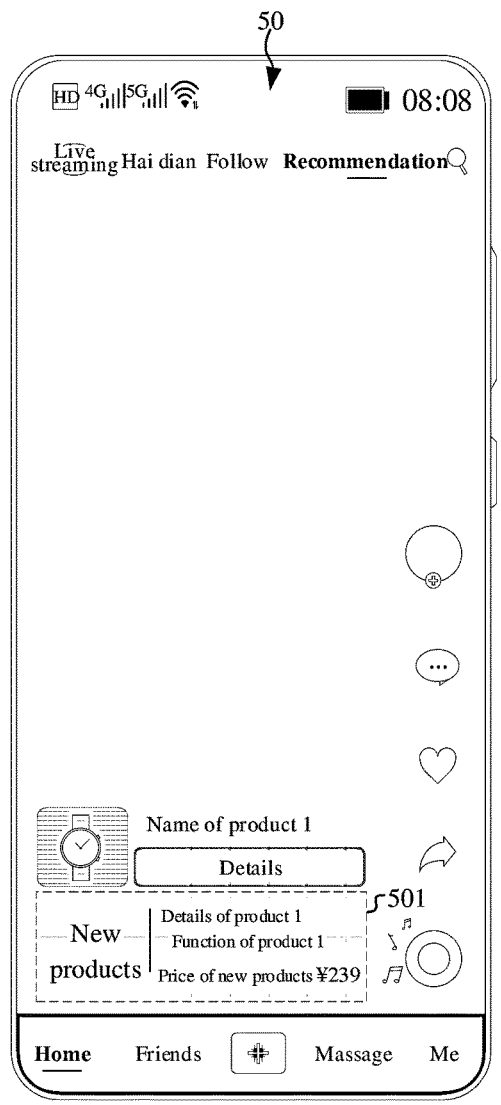
FIGS. 8A to 8B are schematic diagrams of human-computer interaction interfaces provided in some embodiments of the present disclosure.
Figure 8B:
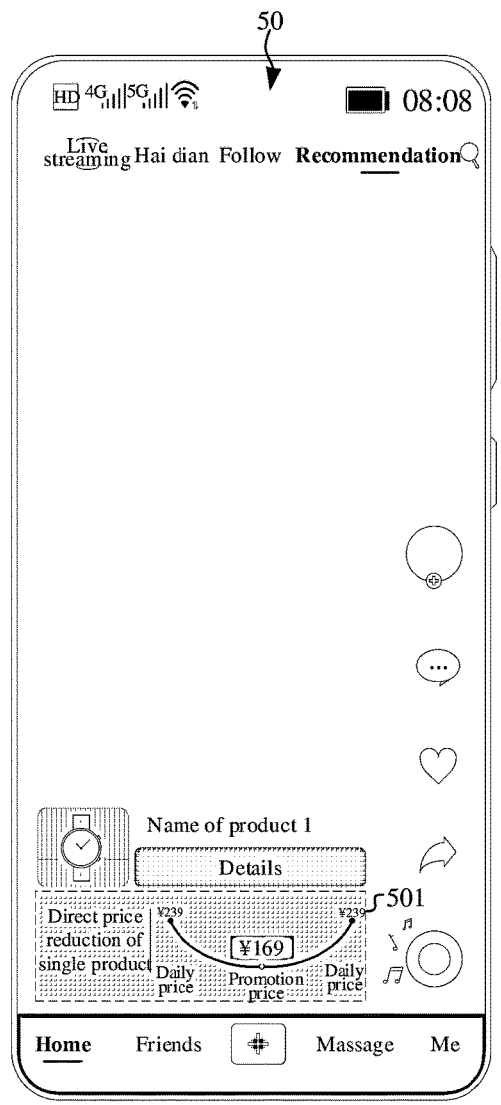

For the sake of illustration, FIGS. 8A to 8B show an example, in which the electronic device is a mobile phone, the application installed on the mobile phone is a short video and social App (App 1), and the target object (target object 1) in App 1 is a game type object.

Referring to FIGS. 8A to 8B, FIGS. 8A to 8B are schematic diagrams of human-computer interaction interfaces provided by an embodiment of the present disclosure.

The App 1 can display an exemplary user interface 50 shown in FIG. 8A on the mobile phone, which is configured to play back a multimedia content of the target object 1, and to display a target area 501 in the interaction component. The target area 501 is configured to display extension information of the target object 1.

In FIG. 8A, introduction information of a product can be described in the target area 501.

After a certain period of time, the App can display an updated target area 501 on the user interface 50. The target area 501 is configured to display extension information of the target object 1.

In FIG. 8B, a curve is used in the target area 501 to represent the normal or promotional prices of the product, allowing users to intuitively understand the historical lowest price of the product, and thereby facilitating the users' purchase of the product.

In summary, by using the extension information displayed in the target area 501, price changes of a product can be displayed in the playing page to achieve a linkage experience in the product change presentation scenario and increase users' interest in knowing the target object.

In some embodiments, the present disclosure provides an application interaction apparatus.

Figure 9:
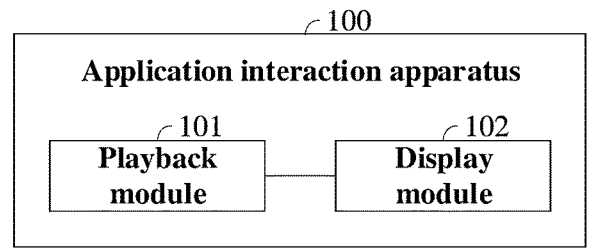
FIG. 9 is a schematic structure diagram of an application interaction apparatus provided in some embodiments of the present disclosure.

Referring to FIG. 9, which is a schematic structure diagram of an application interaction apparatus provided in some embodiments of the present disclosure. The application interaction apparatus of the present disclosure can be provided in an electronic device, and can realize the corresponding operations of the application interaction method described in the embodiments of FIGS. 1 to 8B.

As shown in FIG. 9, the application interaction apparatus 100 provided in the present disclosure may comprise: a playback module 101 and a display module 102.

The playback module 101 is configured to play a multimedia content of a target object. For example, the playback module 101 is configured to play the multimedia content of the target object in an application, wherein the playing page is a user interface of the application.

The display module 102 is configured to display an interaction component of the target object in a playing page for the multimedia content, the interaction component comprising: an interaction card and an action button integrated to the interaction card, wherein the interaction card is configured to describe introduction content of the target object, comprising: an icon of the target object, first basic information of the target object, and extension information of the target object; the action button is configured to provide an entrance to an interaction page of the target object; wherein the first basic information is configured to describe the name and/or title of the target object.

In some embodiments, the display module 102 is particularly configured to, after a first preset period of time, display the interaction component and a return button in the playing page, the return button being configured to switch between the display of the interaction component and the display of second basic information of the target object.

In some embodiments, the display module 102 is further configured to, in response to receiving a first operation triggered on the return button, switch the display of the interaction component in the playing page to the display of the second basic information; or in response to receiving a second operation triggered on the return button, switching the display of the second basic information in the playing page to the display of the interaction component.

In some embodiments, the display module 102 is particularly configured to, after a second preset period of time, display the interaction component and a location identifier in a first state in the playing page, wherein the location identifier is configured to indicate that the interaction component or the second basic information of the target object is displayed in the playing page, and the location identifier in a first state is configured to represent that the interaction component is displayed in the playing page.

In some embodiments, the display module 102 is further configured to, in response to receiving a third operation of sliding on the interaction component, switch the display of the interaction component in the playing page to the display of the second basic information, and switching the location identifier in the first state to a location identifier in a second state, wherein the location identifier in the second state is configured to indicate that the second basic information is displayed in the playing page; or in response to receiving a fourth operation of sliding on an information display area, switching the display of the second basic information component in the playing page to the display of the interaction component, and switching the location identifier in the second state to the location identifier in the first state.

In some embodiments, the transparency of the interaction component is within a preset range.

In some embodiments, the display module 102 is further configured to, in response to receiving a fifth operation triggered on the action button, switch the playing page to the interaction page.

In some embodiments, the playback module 101 is configured to play a dynamic image corresponding to the game interaction content in the playing page, in response to receiving a sixth operation triggered on the target area, wherein the target object is of a game type and extension information for providing game interaction content is displayed in a target area of the interaction card.

In some embodiments, the target object is of an e-commerce type. The display module 102 is further configured to display extension information for providing information on product change in a target area of the interaction card, dynamically displaying the product change in the interaction component.

The application interaction apparatus provided by the present disclosure can execute the above method embodiments. For its specific implementation principle and technical effect, reference can be made to the above method embodiments, which will not be repeated herein.

In some embodiments, the present disclosure provides an electronic device, comprising: one or more processors; a memory; and one or more computer programs stored in the memory; wherein the one or more processors, when executing the one or more computer programs, cause the electronic device to implement application interaction method of the forgoing embodiments.

In some embodiments, the present disclosure provides a chip system applied to an electronic device comprising a display, a memory and a sensor, the chip system comprising: a processor; instructions that, when executed by a processor, cause the processor to perform the application interaction method of the forgoing embodiments.

In some embodiments, the present disclosure provides a non-transitory computer-readable storage medium having stored thereon a computer program that, when executed by a processor, causes an electronic device to perform the application interaction method of the forgoing embodiments.

As an illustration, the present disclosure provides a computer program product that, when the computer program product runs on a computer, causes the computer to perform the application interaction method of the forgoing embodiments.

In some embodiments, the present disclosure provides a computer program, comprising: instructions that, when executed by a processor, cause the processor to perform the application interaction method of any embodiment of the present disclosure.

In the above embodiment, all or part of the functions can be realized by software, hardware, or a combination thereof. When implemented in software, it can be implemented in whole or in part in the form of a computer program product. The computer program product comprises one or more computer instructions. The computer program instructions, when loaded and executed on a computer, can generate in whole or in part the processes or functions according to embodiments of the present disclosure. The computer may be a general purpose computer, a special purpose computer, a computer network, or other programmable device. The computer instructions may be stored in a computer-readable storage medium. The computer-readable storage medium can be any available medium that can be accessed by a computer or a data storage device such as a server, data center, or the like that contains one or more of the available media integrated therein. The available media may be magnetic media (e.g., floppy disks, hard disks, magnetic tapes), optical media (e.g., DVDs), or semiconductor media (e.g., solid state disks (SSDs)), and the like.

Note that, in this description, the use of relational terms, if any, such as "first" and "second" and the like are used solely to distinguish one from another entity or action without necessarily requiring or implying any actual such relationship or order between such entities or actions. Further, terms "comprise", "comprise" or their any other variations are intended to encompass non-exclusive composition, so that a process, method, product or device comprising a series of factors may comprise not only these factors, but also other factors that are not listed explicitly, or factors intrinsic to this process, method, product or device. Without limitation, a factor defined by wording "comprise one . . . " does not exclude the existence of other same factors in a process, method, product or device comprising such factor.

The above descriptions are only specific embodiments of the present disclosure, so that those skilled in the art can understand or implement the present disclosure. Various modifications to these embodiments will be apparent to those skilled in the art, and the generic principles defined herein may be implemented in other embodiments without departing from the spirit or scope of the present disclosure. Accordingly, the present disclosure should not be limited to the specific embodiments described herein, but should be accorded the broadest scope consistent with the principles and novel features disclosed herein.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical storage device, etc.) having computer-usable program code embodied therein.

Heretofore, the present disclosure has been described in detail. In order to avoid obscuring the concepts of the present disclosure, some details known in the art are not described. Based on the above description, those skilled in the art can understand how to implement the technical solutions disclosed herein.

The method and system of the present disclosure may be implemented in many ways. For example, the method and system of the present disclosure may be implemented by software, hardware, firmware, or any combination of software, hardware, and firmware. The above sequence of steps of the method is merely for the purpose of illustration, and the steps of the method of the present disclosure are not limited to the above-described specific order unless otherwise specified. In addition, in some embodiments, the present disclosure may also be implemented as programs recorded in a recording medium, which comprise machine-readable instructions for implementing the method according to the present disclosure. Thus, the present disclosure also covers a recording medium storing programs for executing the method according to the present disclosure.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified without departing from the scope and spirit of the present disclosure. The scope of the disclosure is defined by the following claims.

What is claimed is:

1. An application interaction method, comprising:
    playing a multimedia content of a target object in a playing page, wherein the multimedia content is a video of the target object, and the target object is an object recommended by an application to a user in the video;
    displaying an interaction component of the target object in the playing page, the interaction component comprising an interaction card and an action button displayed on the interaction card, wherein the interaction card is configured to describe an introduction content of the target object, the introduction content comprising an icon of the target object, first basic information of the target object and extension information of the target object, and the action button is configured to provide an entrance to an interaction page of the target object, wherein the first basic information comprises a name and/or a title of the target object, a type of the target object comprises a game type;
    displaying extension information for providing game interaction content in a target area of the interaction card, in response to the target object being of the game type, wherein the game interaction content comprises the extension information providing a game blind box, a glasses-free 3D animation effect, or for a game character switching; and
    playing a dynamic image corresponding to the game interaction content in the playing page, in response to receiving a sixth operation triggered on the target area.

2. The application interaction method according to claim 1, wherein the displaying an interaction component of the target object in a playing page for the multimedia content comprises:
    displaying the interaction component and a location identifier in a first state in the playing page after a second preset period of time, wherein the location identifier is configured to indicate that the interaction component or second basic information of the target object is displayed in the playing page, and the location identifier in the first state is configured to indicate that the interaction component is displayed in the playing page.

3. The application interaction method according to claim 2, further comprising:
    switching the display of the interaction component in the playing page to the display of the second basic information, and switching the location identifier in the first state to a location identifier in a second state, in response to receiving a third operation of sliding on the interaction component, wherein the location identifier in the second state is configured to indicate that the second basic information is displayed in the playing page; and
    switching the display of the second basic information component in the playing page to the display of the interaction component, and switching the location identifier in the second state to the location identifier in the first state, in response to receiving a fourth operation of sliding on an information display area.

4. The method according to claim 1, wherein a transparency of the interaction component is within a preset range.

5. The application interaction method according to claim 1, further comprising:
    switching the playing page to the interaction page, in response to receiving a fifth operation triggered on the action button.

6. The application interaction method according to claim 1, wherein the playing the multimedia content of the target object comprising:
    playing the multimedia content of the target object in an application, wherein the playing page is a user interface of the application.

7. The application interaction method according to claim 1, wherein the displaying an interaction component of the target object in a playing page for the multimedia content comprises:
    displaying the interaction component and a return button in the playing page after a first preset period of time, the return button being configured to switch between display of the interaction component and display of second basic information of the target object, the second basic information comprises the name and/or the title of the target object.

8. The application interaction method according to claim 7, further comprising:

switching the display of the interaction component in the playing page to the display of the second basic information, in response to receiving a first operation triggered on the return button; and switching the display of the second basic information in the playing page to the display of the interaction component, in response to receiving a second operation triggered on the return button.

9. An electronic device, comprising:

one or more processors;

a memory; and one or more computer programs stored in the memory, the one or more processors, when executing the one or more computer programs, enable the electronic device to implement an application interaction method comprising:

playing a multimedia content of a target object in a playing page, wherein the multimedia content is a video of the target object, and the target object is an object recommended by an application to a user in the video;

displaying an interaction component of the target object in the playing page, the interaction component comprising an interaction card and an action button displayed on the interaction card, wherein the interaction card is configured to describe an introduction content of the target object, the introduction content comprising an icon of the target object, first basic information of the target object and extension information of the target object, and the action button is configured to provide an entrance to an interaction page of the target object, wherein the first basic information comprises a name and/or a title of the target object, a type of the target object comprises a game type;

displaying extension information for providing game interaction content in a target area of the interaction card, in response to the target object being of the game type, wherein the game interaction content comprises the extension information providing a game blind box, a glasses-free 3D animation effect, or for a game character switching; and playing a dynamic image corresponding to the game interaction content in the playing page, in response to receiving a sixth operation triggered on the target area.

10. The electronic device according to claim 9, wherein the processor is configured to:

display the interaction component and a location identifier in a first state in the playing page after a second preset period of time, wherein the location identifier is configured to indicate that the interaction component or second basic information of the target object is displayed in the playing page, and the location identifier in the first state is configured to indicate that the interaction component is displayed in the playing page.

11. The electronic device according to claim 10, wherein the processor is configured to:

switch the display of the interaction component in the playing page to the display of the second basic information, and switching the location identifier in the first state to a location identifier in a second state, in response to receiving a third operation of sliding on the interaction component, wherein the location identifier in the second state is configured to indicate that the second basic information is displayed in the playing page; and switch the display of the second basic information component in the playing page to the display of the interaction component, and switch the location identifier in the second state to the location identifier in the first state, in response to receiving a fourth operation of sliding on an information display area.

12. The electronic device according to claim 9, wherein transparency of the interaction component is within a preset range.

13. The electronic device according to claim 9, wherein the processor is configured to:

switch the playing page to the interaction page, in response to receiving a fifth operation triggered on the action button.

14. The electronic device according to claim 9, wherein the processor is configured to:

display the interaction component and a return button in the playing page after a first preset period of time, the return button being configured to switch between display of the interaction component and display of second basic information of the target object.

15. The electronic device according to claim 14, wherein the processor is configured to:

switch the display of the interaction component in the playing page to the display of the second basic information, in response to receiving a first operation triggered on the return button; and switch the display of the second basic information in the playing page to the display of the interaction component, in response to receiving a second operation triggered on the return button.

16. A non-transitory computer storage medium storing computer instructions that, when being executed by an electronic device, cause the electronic device to implement an application interaction method comprising:

playing a multimedia content of a target object in a playing page, wherein the multimedia content is a video of the target object, and the target object is an object recommended by an application to a user in the video;

displaying an interaction component of the target object in the playing page, the interaction component comprising an interaction card and an action button displayed on the interaction card, wherein the interaction card is configured to describe an introduction content of the target object, the introduction content comprising an icon of the target object, first basic information of the target object and extension information of the target object, and the action button is configured to provide an entrance to an interaction page of the target object, wherein the first basic information comprises a name and/or a title of the target object, a type of the target object comprises a game type;

displaying extension information for providing game interaction content in a target area of the interaction card, in response to the target object being of the game type, wherein the game interaction content comprises the extension information providing a game blind box, a glasses-free 3D animation effect, or for a game character switching; and playing a dynamic image corresponding to the game interaction content in the playing page, in response to receiving a sixth operation triggered on the target area.

* * * * *